United States Patent
Kakino et al.

(10) Patent No.: US 7,487,005 B2
(45) Date of Patent: Feb. 3, 2009

(54) PROCESS PLANNING METHOD, PROCESS PLANNING APPARATUS AND RECORDING MEDIUM

(75) Inventors: Yoshiaki Kakino, 256-5, Iwakurahanazono-cho, Sakyo-ku, Kyoto-shi, Kyoto 606-0024 (JP); Atsushi Matsubara, Kyoto (JP); Iwao Yamaji, Hikone (JP); Yoshifumi Fujita, Urayasu (JP); Hidenori Saraie, Yamatokoriyama (JP); Hisashi Otsubo, Okayama (JP); Yoshinori Yamaoka, Aichi (JP); Tomonori Sato, Tokyo (JP)

(73) Assignees: Yoshiaki Kakino, Kyoto (JP); Mori Seiki Co., Ltd., Nara (JP); Yasda Precision Tools K.K., Okayama (JP); Yamazaki Mazak Corp., Aichi (JP); Mitsubishi Electric Corp., Tokyo (JP)

( * ) Notice: Subject to any disclaimer, the term of this patent is extended or adjusted under 35 U.S.C. 154(b) by 20 days.

(21) Appl. No.: 11/253,672

(22) Filed: Oct. 20, 2005

(65) Prior Publication Data
US 2006/0089746 A1    Apr. 27, 2006

(30) Foreign Application Priority Data
Oct. 21, 2004   (JP) .............................. 2004-307397

(51) Int. Cl.
G06F 19/00 (2006.01)
G05B 19/4093 (2006.01)

(52) U.S. Cl. ........................ 700/179; 700/173; 700/175; 700/182

(58) Field of Classification Search ................. 700/173, 700/182, 179, 97, 160, 175
See application file for complete search history.

(56) References Cited

U.S. PATENT DOCUMENTS 4,031,368 A * 6/1977 Colding et al. .............. 700/173

(Continued)

FOREIGN PATENT DOCUMENTS

CN          1440522 A        9/2003

(Continued)

OTHER PUBLICATIONS

Fukuda et al., "Development of automatic production planning system to adapt to flexible machining operation", Apr. 20, 2004, pp. 401-402.

(Continued)

Primary Examiner—Albert DeCady
Assistant Examiner—Steven R Garland
(74) Attorney, Agent, or Firm—Birch, Stewart, Kolasch & Birch, LLP

(57) ABSTRACT

A process planning apparatus extracts a region to be machined based on the difference of the shape data before and after machining of the workpiece, replaces the extracted region into combinations of the predetermined machining features, allocates a predetermined fixed cycle to each of the replaced machining features, and applies an assessment function relating to a machining time and a life of the end mill to each of the combinations of the machining features to which the fixed cycles are respectively allocated, thereby selecting a group of the fixed cycles which makes an assessment value obtained by the assessment function optimum as the optimal process. By these steps, it becomes possible to design the process for causing the NC machine employing end mills as a cutting tool to perform a predetermined machining of a workpiece without relying on the experience of the designer, and without necessitating complicated work.

18 Claims, 19 Drawing Sheets

U.S. PATENT DOCUMENTS

| | | |
|---|---|---|
| 7,065,420 B1 * | 6/2006 | Philpott et al. ............... 700/97 |
| 2003/0125829 A1 * | 7/2003 | Kakino et al. ............... 700/173 |
| 2003/0130757 A1 | 7/2003 | Kamiya |
| 2003/0170085 A1 * | 9/2003 | Kakino et al. ............... 409/132 |
| 2003/0171842 A1 * | 9/2003 | Teramoto et al. ............ 700/182 |

FOREIGN PATENT DOCUMENTS

| | | | |
|---|---|---|---|
| JP | 2000-84794 A | | 3/2000 |
| JP | 2002-196809 | * | 7/2002 |
| JP | 2003-263208 A | | 9/2003 |
| JP | 2004-174697 A | | 6/2004 |

OTHER PUBLICATIONS

Lei et al., "Optimization of Numerical Control Milling Parameters," May 2001, pp. 11-14, 1994-2007 China Academic Journal Electronic Publishing House.

* cited by examiner

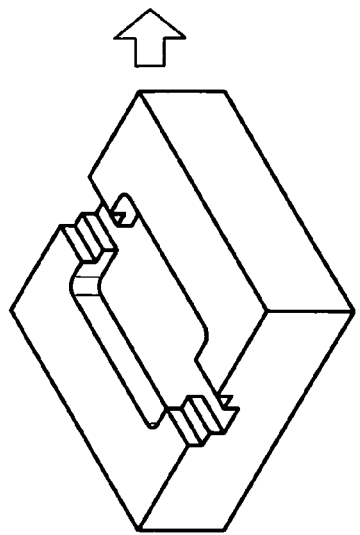
FIG. 7A  FIG. 7B  FIG. 7C
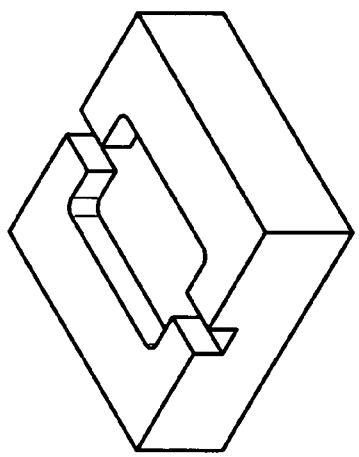
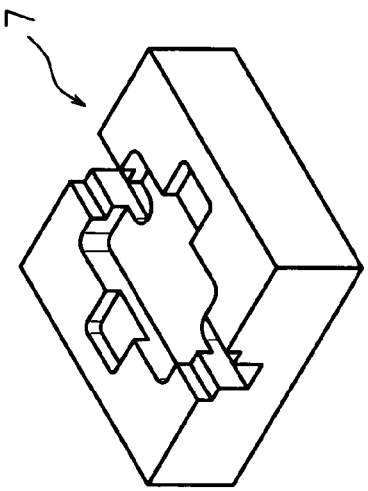
FIG. 7D  FIG. 7E

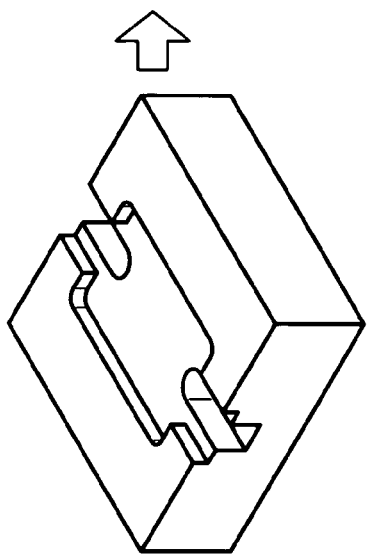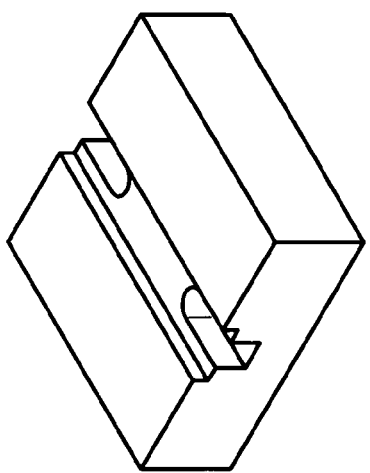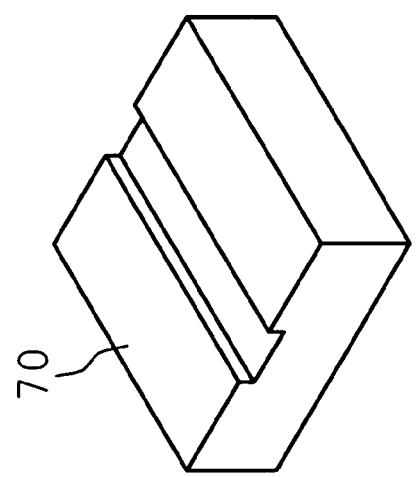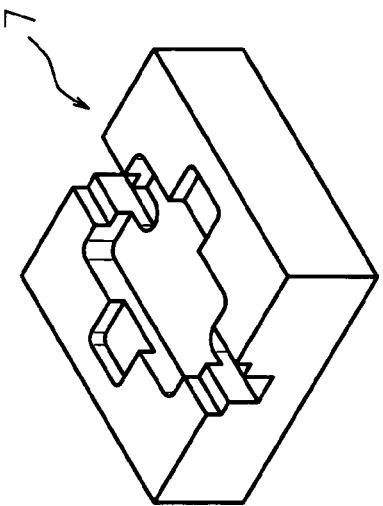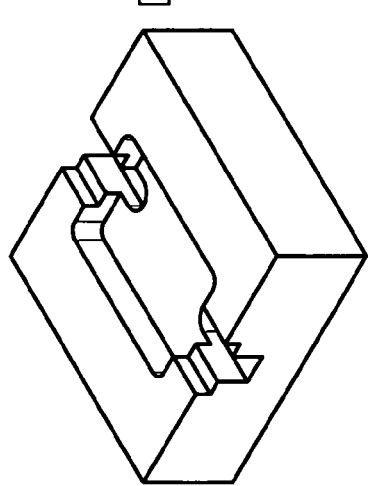

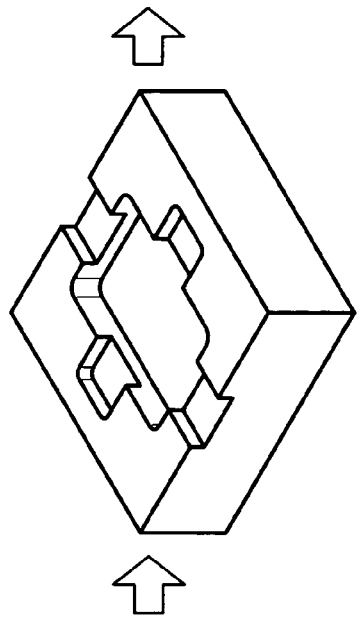
FIG. 11A  FIG. 11B  FIG. 11C
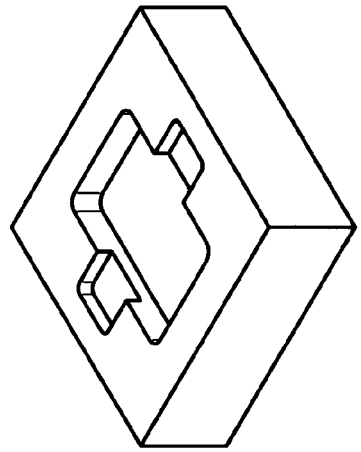
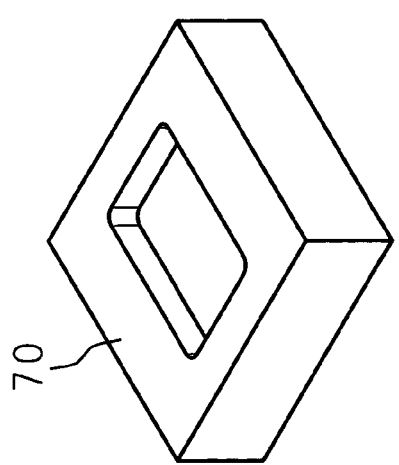
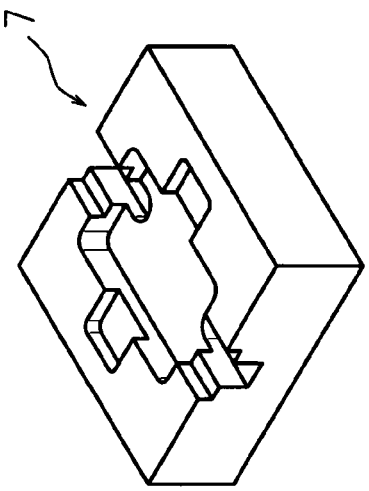
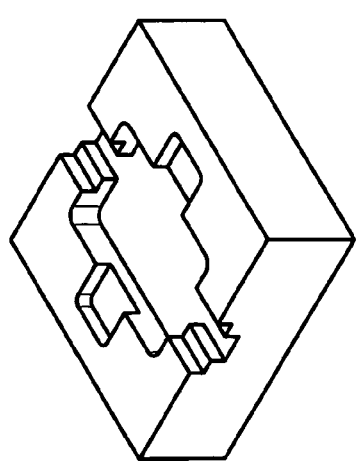
FIG. 11D  FIG. 11E

FIG.13A

| PATTERN 1 | | | |
|---|---|---|---|
| MACHINING FEATURE | MACHINING TIME min | MACHINING LENGTH m | MACHINING COST yen |
| GROOVE1 (×1) | 10.0 | 259.3 | 2,150 |
| SHOULDER1 (×1) | 8.1 | 176.4 | 2,297 |
| SHOULDER2 (×2) | 2.2 | 26.0 | 401 |
| U-GROOVE (×2) | 2.4 | 69.2 | 545 |
| SHOULDER3 (×1) | 4.1 | 108.9 | 895 |
| TOTAL | 26.8 | | 6,288 |

FIG.13B

| PATTERN 2 | | | |
|---|---|---|---|
| MACHINING FEATURE | MACHINING TIME min | MACHINING LENGTH m | MACHINING COST yen |
| POCKET | 14.3 | 332.4 | 3,670 |
| GROOVE1 (×2) | 3.8 | 92.4 | 828 |
| SHOULDER1 (×2) | 2.2 | 26.0 | 401 |
| U-GROOVE (×2) | 2.4 | 69.2 | 545 |
| SHOULDER2 (×1) | 4.1 | 108.9 | 894.6 |
| TOTAL | 26.8 | | 6,339 |

FIG. 13C

| PATTERN 3 | | | |
|---|---|---|---|
| MACHINING FEATURE | MACHINING TIME min | MACHINING LENGTH m | MACHINING COST yen |
| POCKET1 | 5.8 | 145.0 | 1,240 |
| GROOVE1 (×2) | 8.0 | 174.0 | 1,654 |
| SHOULDER1 (×1) | 3.4 | 88.1 | 728 |
| POCKET2 | 10.4 | 258.4 | 2,209 |
| GROOVE2 (×2) | 2.0 | 50.2 | 441 |
| U-GROOVE (×2) | 2.4 | 69.2 | 545 |
| TOTAL | 32.0 | | 6,817 |

FIG. 13D

| PATTERN 4 | | | |
|---|---|---|---|
| MACHINING FEATURE | MACHINING TIME min | MACHINING LENGTH m | MACHINING COST yen |
| GROOVE1 (×1) | 9.1 | 204.8 | 1,897 |
| U-GROOVE (×2) | 5.0 | 138.6 | 1,090 |
| SHOULDER1 (×1) | 7.0 | 178.4 | 1,500 |
| POCKET | 10.4 | 258.4 | 2,209 |
| SHOULDER2 (×1) | 4.1 | 108.9 | 895 |
| TOTAL | 35.6 | | 7,591 |

F I G. 1 3 E

| PATTERN 5 | | | |
|---|---|---|---|
| MACHINING FEATURE | MACHINING TIME min | MACHINING LENGTH m | MACHINING COST yen |
| POCKET | 14.3 | 332.4 | 3,670 |
| SHOULDER1 (×1) | 4.1 | 108.9 | 895 |
| GROOVE1 (×2) | 4.4 | 80.4 | 873 |
| GROOVE2 (×2) | 2.0 | 50.2 | 441 |
| U-GROOVE (×2) | 2.4 | 69.2 | 545 |
| TOTAL | 27.2 | | 6,424 |

FIG.14

| PRO-CESS | MACHINING FEATURE | FIXED CYCLES | TOOL mm | MACHINING SIZE mm | TARGET VALUE OF CUTTING FORCE N | R.P.M min⁻¹ Cm MINI-MUM | R.P.M min⁻¹ Cs MINI-MUM | XY CUT-IN AMOUNT mm | Z CUT-IN AMOUNT mm | Z mm |
|---|---|---|---|---|---|---|---|---|---|---|
| 1 | GROOVE 1 | TROCHOID GROOVE | φ10 | GROOVE WIDTH 15 | 300 | 2800 | 3640 | 0.4 | 10 | -20.0 |
| | | SIDE SURFACE | φ10 | GROOVE WIDTH 15→20 | 300 | 2800 | 3640 | 0.5 | 10 | -20.0 |
| 2 | SHOULDER1 | SIDE SURFACE | φ20 | GROOVE WIDTH 20→80 | 848.5 | 1400 | 1820 | 0.7 | 20 | -20.0 |
| | | CORNER | φ10 | R40→R7.5 | 300 | 2800 | 3640 | 1.0 | 10 | -20.0 |
| 3 | SHOULDER2 (×2) | SIDE SURFACE | φ10 | GROOVE WIDTH 20→40 | 300 | 2800 | 3640 | 0.4 | 10 | -10.0 |
| 4 | U-GROOVE (×2) | TROCHOID GROOVE | φ10 | GROOVE WIDTH 15 | 300 | 2800 | 3640 | 0.4 | 10 | -30.0 |
| | | SIDE SURFACE | φ10 | GROOVE WIDTH 15→20 | 300 | 2800 | 3640 | 1.3 | 10 | -30.0 |
| 5 | SHOULDER3 | TROCHOID GROOVE | φ10 | GROOVE WIDTH 30 | 300 | 2800 | 3640 | 0.9 | 10 | -10.0 |
| | | SIDE SURFACE | φ10 | GROOVE WIDTH 30→40 | 300 | 2800 | 3640 | 2.5 | 10 | -10.0 |
| | | CORNER | φ10 | R20→R5 | 300 | 2800 | 3640 | 1.0 | 10 | -10.0 |

FIG.15

| PROCESS | MACHINING FEATURE | MACHINING METHOD | TOOL mm | R.P.M min⁻¹ | FEED RATE mm/min | XY CUT-IN AMOUNT mm | Z CUT-IN AMOUNT mm | Z mm |
|---|---|---|---|---|---|---|---|---|
| 1 | φ40 HOLE | HELICAL | φ20 | 1200 | 840 | 20.0 | CUTTING ANGLE 0.9° 1.0 | −20.0 |
| 2 | POCKET | SIDE SURFACE | φ10 | 1500 | 600 | 9.8 | 5.0 | −20.0 |
| 3 | SHOULDER | GROOVE SIDE SURFACE | φ10 | 1500 | 600 | 10 7.5 | 5.0 | −10.0 |
| 4 | GROOVE | GROOVE SIDE SURFACE | φ20 | 1200 | 480 | 20.0 5.0 | 1.0 10.0 | −10.0 |
| 5 | U-GROOVE | GROOVE | φ20 | 1200 | 480 | 20.0 | 1.0 | −30.0 |

PROCESS PLANNING METHOD, PROCESS PLANNING APPARATUS AND RECORDING MEDIUM

CROSS-REFERENCE TO RELATED APPLICATIONS

This Nonprovisional application claims priority under 35 U.S.C. § 119(a) on Patent Application No. 2004-307397 filed in Japan on Oct. 21, 2004, the entire contents of which are hereby incorporated by reference.

BACKGROUND OF THE INVENTION

1. Field of the Invention

The present invention relates to a process planning method which makes it possible to design an optimum process including the size of cutting tools to be used and machining order in machining a workpieces into the desired shape with a machine tool equipped with end mills serving as cutting tools. The invention also relates to a process planning apparatus constituted to perform the method mentioned above. Furthermore, the invention relates to a recording medium in which computer programs are stored for executing the above-mentioned method with a computer.

2. Description of Related Art

An NC (Numerical Control) machine for moving a cutting tool along a tool path defined in advance numerically relative to a workpiece fixed on a machine table and thereby machining the workpiece in a predetermined manner is extensively adopted for the cutting processes for machining workpieces into various configurations with end mills used as cutting tools, besides drilling processes as for which the drills, are used as cutting tools, and tapping processes for which the taps are used as cutting tools.

When machining with the NC machine of the above-mentioned kind is implemented, a process planning is performed first to determine cutting tools to be used, machining processes with the respective cutting tools, and the contents of work in each machining process, according to a final machining shape. Next, an NC program is prepared to set tool paths according to the results of the process planning, together with a feed rate in each part on the respective tool paths, and then machining is performed by operating the cutting tools and machine table based on the servo control according to the NC program.

The applicant of the present invention has already proposed an NC program generating method applicable to the NC machine for which an end mills are used as a cutting tools (Japanese Patent Application Laid-Open No. 2003-263208 (2003)). This method includes the steps of: replacing a final machining shape with a plurality of fixed cycles prepared in each machining process defined as the results of a process planning; estimating cutting force exerted on the end mill on a tool path assumed in the respective fixed cycles; and determining a tool path in which the estimated value converges into an proper value together with the feed rate in each portion of the tool path. According to the method, it is possible to prepare the NC program in which both high machining efficiency and high machining accuracy can be attained while reducing the damage and excessive wear of the end mill, without relying on the operator's experience, and without the complicated work being required.

On the other hand, there have been the following problems. A process planning necessary in the pre-stage for preparing an NC program as above has so far been practiced by the designer versed in industrial technology based on his experience (past achievements), so the results of the actually prepared process planning depend on the faculty of the designer. Moreover, the results of the process planning prepared by the planner having abundant experiences are not necessarily optimum. Therefore, there is no assurance that the NC program prepared by the afore-described method based on the results of such process planning and the machining to be practiced according to such NC program are optimum from the ultimate viewpoint of reducing the composite machining cost after taking into account the machining time, the durability of the end mill, and the like. Thus, there has been the possibility of losing an opportunity of further reduction of the machining cost.

In recent years, attempts have been made to automate the process planning by dividing the complicated machining shape into plural sorts of machining features of simple shape, but those attempts are no more than to determine the order of eliminating the machining features based on the past achievements. Accordingly, they are only used as auxiliary tools for planner having little experience.

BRIEF SUMMARY OF THE INVENTION

The present invention has been made under such circumstances. An object of the invention is to provide a process planning method which makes it possible to design an optimum processes for causing an NC machine to perform predetermined machining of a workpieces with end mills used as cutting tools, without relying on the planner's experience, and without requiring the complicated work. Another object of the invention is to provide an apparatus to be used in the implementation of the method, and also to provide a recording medium storing a computer program for implementing the method.

An aspect of the invention is a process planning method for determining a process for performing predetermined machining of a workpiece using a plurality of types of end mills, the process including selection of the end mills to be used and an order of the machining, the method comprising the steps of: extracting a region to be machined based on a difference in shapes of the workpiece before and after the machining; replacing the extracted region with combinations of predetermined machining features; allocating a predetermined fixed cycle to each of the replaced machining features; and applying an assessment function relating to a machining time and a life of the end mills to each combination of the machining features to which the fixed cycle is allocated, thereby selecting, as an optimum process, a group of the fixed cycles which makes an assessment value obtained by the assessment function optimum.

Another aspect of the invention is a process planning apparatus for determining a process for performing predetermined machining of a workpiece using a plurality of types of end mills, process including selection of the end mills to be used and an order of the machining, the apparatus comprising: a database in which a plurality of predetermined machining features and fixed cycles are stored; extracting means for extracting a region to be machined based on a difference of externally provided shape data of a workpiece before and after the machining; replacing means for replacing the region extracted by the extracting means with combinations of the machining features stored in the database; allocating means for allocating the fixed cycles stored in the data base, respectively, to the machining features replaced by the replacing means; and means for applying an assessment function relating to a machining time and lives of the end mills to each combination of the machining features to which the fixed cycle is allocated by the allocating means, thereby obtaining an assessment value by the assessment function.

Further another aspect of the invention is a process planning apparatus for determining a process for performing predetermined machining of a workpiece using a plurality of types of end mills, the process including selection of the end mills to be used and an order of the machining, the apparatus comprising: a database in which a plurality of predetermined kinds of machining features and fixed cycles are stored; and a computer to be connected to the data base, and capable of performing the following operations of: extracting a region to be machined based on a difference of externally provided shape data of a workpiece before and after the machining process; replacing the extracted region with combinations of the machining features stored in the database; allocating the fixed cycles, respectively, to the replaced machining features; and applying an assessment function relating to a machining time and lives of the end mills to each combination of the machining features to which the fixed cycle is allocated, thereby obtaining an assessment value by the assessment function.

Still further another aspect of the invention is a computer memory product readable by a computer to execute a method for determining a process for performing predetermined machining of a workpiece using a plurality of types of end mills, the process including selection of the end mills to be used and an order of the machining, the computer memory product comprising: first step for extracting a region to be machined based on a difference in shapes before and after the machining of the workpiece; second step for replacing the extracted region with combinations of predetermined machining features; third step for allocating a predetermined fixed cycle to each of the replaced machining features; and fourth step for applying an assessment function relating to a machining time and lives of the end mills to each combination of the machining features to which the fixed cycle is allocated, thereby selecting, as an optimum process, a group of the fixed cycles which makes an assessment value obtained by the assessment function optimum.

In the present invention as recited above, plural sorts of fixed cycles which can be practiced by end milling and the machining features that can be obtained by the combinations of these fixed cycles are set in advance. At first, based on the differences in the shapes before and after the machining of the workpiece, the machining region is extracted, the machining region is replaced with a combination of the machining features, and at least one fixed cycle is optionally allocated to the respective machining features. Next, the results of the allocations are applied to the assessment functions associated with a machining time and durable life of the end mill. Then, a combination of the machining features and an allocation of the fixed cycles in which an assessment value indicating the overall machining cost obtained by the assessment function is optimized are determined as the optimum process. The assessment function may be the function for obtaining the pure machining cost from the machine charge including labor cost, machining time, tool cost and consumption rate of tool. Alternatively, it may be a function to determine a machining cost with taking an estimated profit into account, after considering a selling price of the final product and modifying the machining cost described above.

The above and further objects and features of the invention will more fully be apparent from the following detailed description with accompanying drawings.

BRIEF DESCRIPTION OF THE SEVERAL VIEWS OF THE DRAWINGS

FIGS. 7A to 7E are illustrative views of the selection procedure of the machining features;

FIGS. 10A to 10E are illustrative views of the selection procedure of the machining features;

FIGS. 11A to 11E are illustrative views of the selection procedure of the machining features;

FIGS. 13A to 13E are graphic charts showing the results of practice of the operation planning on each of the patterns 1 to 5 given in FIG. 7 to FIG. 11;

FIG. 14 is a graphic chart showing the results of the process plan based on the optimum pattern;

FIG. 15 is a graphic chart showing the results of the process plan by a production engineer.

DETAILED DESCRIPTION OF THE PREFERRED EMBODIMENTS

The present invention is explained in detail with reference to the drawings illustrative of its embodiment hereinafter.

Figure 1:
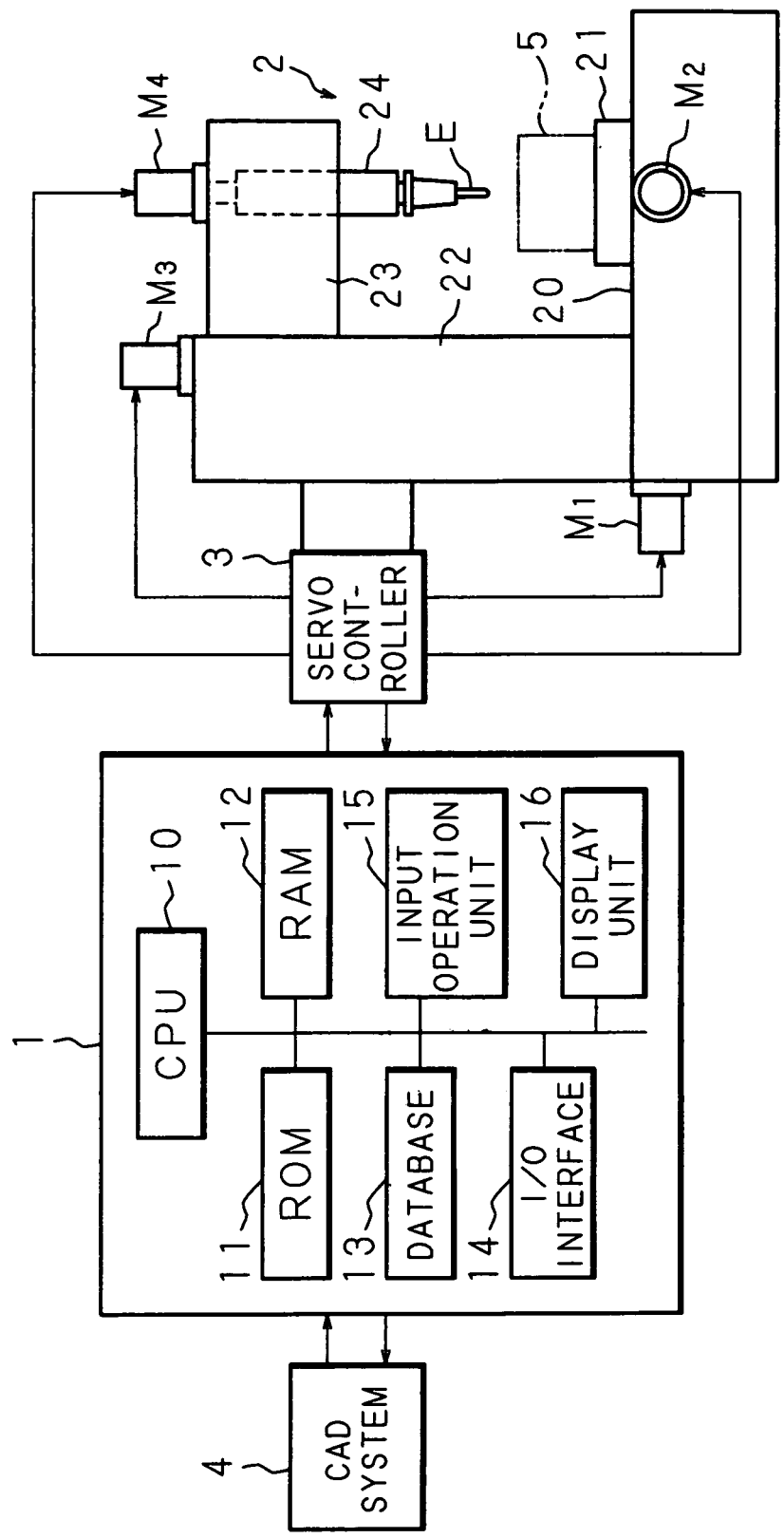
FIG. 1 is a block view showing the configuration of the NC machine equipped with the process planning apparatus used in the implementation of the process planning method according to the present invention.

FIG. 1 is a block diagram showing the configuration of an NC machine equipped with a process planning apparatus to be used in the implementation of the process planning method according to the present invention. As illustrated, a process planning apparatus 1 is composed of a computer comprising: a CPU (Central Processing Unit) 10 as a calculation processor; a ROM (Read Only Memory) 11 in which the implementation procedures of the process planning method according to the present invention are stored; a RAM (Random Access Memory) 12 for temporarily storing diverse variables necessary for the implementation of the process planning method according to the present invention; and a database 13 referred to in the implementation of the process planning method according to the present invention and an input & output (I/O) interface 14. This process planning apparatus 1 furter comprises an input operation unit 15 such as keyboard, mouse, or the like to be operated by an operator, and a display unit 16 such as a CRT display, a liquid crystal display, or the like for displaying various information obtained in each step in the implementation of the process planning method according to the present invention.

The NC machine tool 2 comprises a bed 20 as a platform, a machine table 21 supported on the bed 20 and freely movable in the two directions (X direction and Y direction) perpendicular to each other in a horizontal plane and a spindle head 23 supported by a column 22 standing on one side of the bed 20 and freely movable in the vertical direction (Z direction) in the position above the machine table 21. The end mill E serving as a cutting tool is installed into a removable manner via appropriate attaching means at the lower end of the spindle 24 dropping from the spindle head 23.

The machine table 21 is structured so as to move forward in either direction of X and Y according to the rotation of the ball screw (not illustrated) driven for rotation by each of the table feed motors M1 and M2. The spindle head 23 is structured so as to move forward in the direction Z according to the rotation of the ball screw (not illustrated) driven by the spindle head feed motor M3. Further, the spindle 24 is connected to a spindle motor M4 attached to the upper portion of the spindle head 23, so that the spindle 24 is driven for rotation around its axis together with the end mill E attached at its lower end according to the rotation of the spindle motor M4. In FIG. 1 the spindle motor M4 is illustrated to be attached outside the spindle head 23, however, in NC machines for high speed machining in recent years, the spindle motor M4 is generally built inside the spindle head 23.

The NC machine 2 having the above-mentioned configuration performs machining as stated below. At first, the workpiece 5 as a machining object is fixed by position setting to a predetermined position on the machine table 21. With the end mill E being attached to the spindle 24 of the spindle head 23, the end mill E is rotated by the spindle motor M4: the end mill E is moved relatively to the workpiece 5 fixed on the machine table 21 along a tool path predetermined numerically, by feeding in X and Y directions carried out by the rotation of the table feed motors M1 and M2 and by feeding in Z direction carried out by the rotation of the spindle head feed motor M3. By virtue of this, the workpiece 5 is machined into a predetermined shape.

The NC program showing the tool path of the end mill E which is necessary for this machining is prepared in the process planning apparatus 1, and is given to the servo controller 3 via an input and output interface 14. The servo controller 3 controls the table feed motors M1, M2, the spindle head feed motor M3 and the spindle motor M4, thereby feeding the end mill E according to the NC program given from the process planning apparatus 1.

The process planning apparatus 1 shown in FIG. 1 is connected on line with the CAD (Computer-Aided Design) system 4. In the CAD system 4, designing of the final products to be manufactured by machining the workpiece 5 is performed, and the shape data of the final products and the workpiece 5 to be output from the CAD system 4 as a result of this designing is given to the process planning apparatus 1 through the input and output interface 14.

In the process planning apparatus 1, using the shape data given from the CAD system 4, process planning for determining the machining procedures for the workpiece 5 is performed according to the process planning method of the present invention to be described later. The process planning includes the steps of selecting the tool to be used, determining the work contents, and preparing the CL (Cutter Location) data in the respective procedure. Furthermore, in the process planning apparatus 1, the above-mentioned NC program is prepared based on the results of the process planning as stated above and the machining conditions input by an operation of the input operation unit 15.

In the configuration shown in FIG. 1, information is exchanged on line among the process planning apparatus 1, the servo controller 3 and the CAD system 4, however, these apparatuses may be configured off line to each other, whereby information may be exchanged via an appropriate recording medium such as a magnetic disk or an optical disk. Alternatively, the process planning apparatus 1 may be incorporated into the CAD system 4, so that the processes from the shapes design of the final product, through the process plan, to the NC program preparation may be carried out integrally.

In the process planning apparatus 1, the process planning method according to the present invention is performed in the procedures given below, whereby the process planning is carried out for determining the machining procedure of the workpiece. In the process planning method of the present invention, the operations of the end mill E in the machining are limited to the combinations of plural kinds of preset fixed cycles. Here, the fixed cycles mean a machining cycle in which the tool path pattern can be univocally determined according to the shapes before and after the machining. When this fixed cycle is given, an NC program can be prepared by setting the feed pitch and feed rate according to the machining conditions. FIGS. 2A to 2F are the illustrative views of the fixed cycles in the end milling process. As shown in these figures, when an end mill E is used as a cutting tool, the fixed cycles include, for example, the 6 kinds of fixed cycles.

Figure 2A:
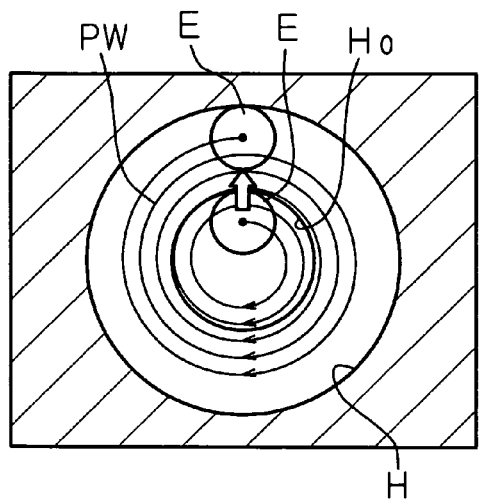
FIGS. 2A to 2F are illustrative views of the fixed cycle in the end milling.

A fixed cycle shown in FIG. 2A is a boring cycle using spiral path. This fixed cycle is used when a finished hole H having the desired diameter is formed by bringing the end mill E into direct contact with the inner circumference of a hole H0, and feeding the end mill E along the spirally curving shaped tool path PW which expands outwardly in an optional feed pitch. More specifically, the aforementioned tool path PW is set so as to serially increase the radius in each path, however, it may be set as an assembly of the circular tool paths whose radius is increased stepwise in each path.

Figure 2B:
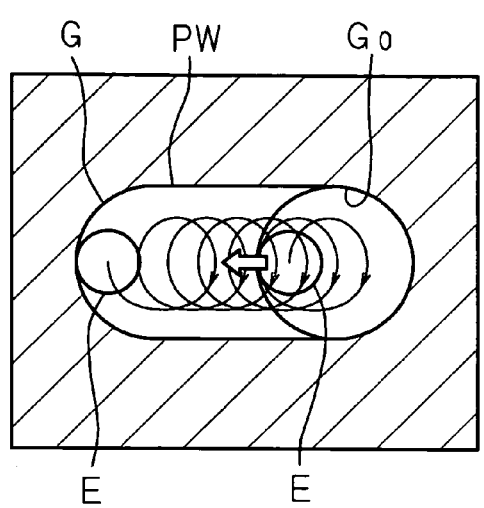

A fixed cycle shown in FIG. 2B is a grooving cycle using trochoid path. This fixed cycle is used when a longitudinal groove G having the width corresponding to a diameter of a prepared hole G0 by extending the prepared hole G0 having a circular section to one side in the radial direction using the end mill E having the smaller diameter than that of the prepared hole G0. The end mill E moves forward along the tool path PW set into trochoid curve shape which advances on one side by an optional feed pitch and cuts the downstream side in the moving direction into crescent shape in the respective paths.

Figure 2C:
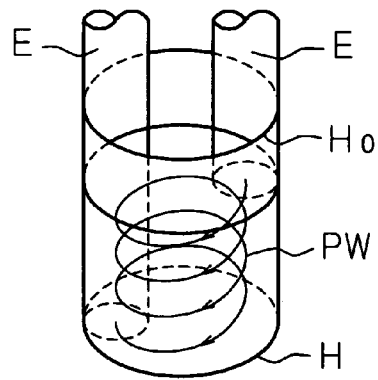

A fixed cycle shown in FIG. 2C is a boring cycle using helical path. This fixed cycle is used when a finished hole H having deep bottom of the same diameter as a prepared hole H0 is formed, by bringing the end mill E into direct contact with the inner circumference of the prepared hole having a circular section, and feeding the end mill E along the spiral shaped tool path PW which advances at an optional pitch in the direction of depth (Z direction), as shown by arrow mark in the drawing.

Figure 2D:
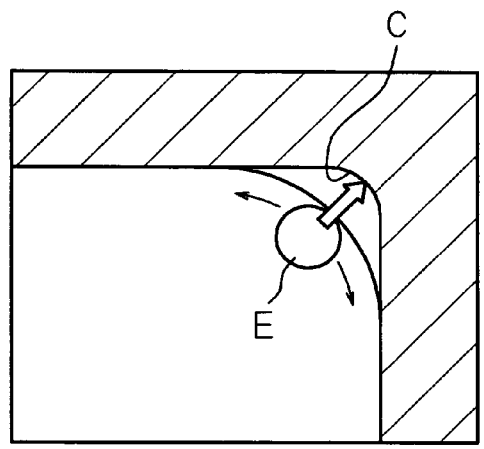

A fixed cycle shown in FIG. 2D is a corner cutting cycle. In this fixed cycle, when a corner part C of the machining region is machined into a round shape having a desired diameter, the end mill E having a radius no larger than that of the round shape is used, and the end mill E moves reciprocally along the corner part C as shown by an arrow mark in the drawing, while exerting the feed at an optional pitch to the direction of approaching to the corner part C, as shown by white base arrow marks in the drawing.

Figure 2E:
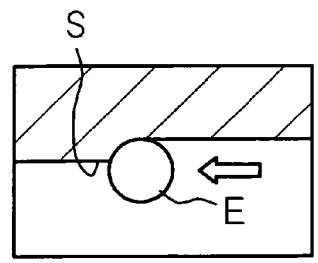

A fixed cycle shown in FIG. 2E is a side milling cycle. This fixed cycle is for cutting the workpiece by an optional feed pitch by feeding the end mill E along the side surface S of the workpiece. This cycle is used in combination with the aforementioned boring cycle using spiral path and grooving cycle using trochoid path, when, for example, the inner surface of a recess provided in the workpiece is cut to expand the recess outwardly.

Figure 2F:
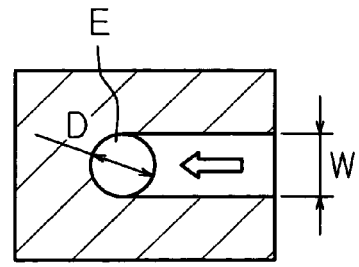

A fixed cycle shown in FIG. 2F is a whole width grooving cycle. This fixed cycle is a machining cycle for forming a groove having the width W equal to the diameter D of the above end mill E, by feeding the end mill E toward one side in the radial direction, and by cutting the workpiece in the whole width on the upstream side in the feed direction.

Though the side milling cycle and the whole width grooving cycle are not the fixed cycles in a strict sense, they are to be treated in line with the fixed cycle.

In the process planning method according to the present invention, when the machining shape of the workpiece 5 is given, the region to be machined is divided into a plurality of machining features and a combination of the fixed cycles to be allotted to the respective machining features is determined.

Figure 3A:
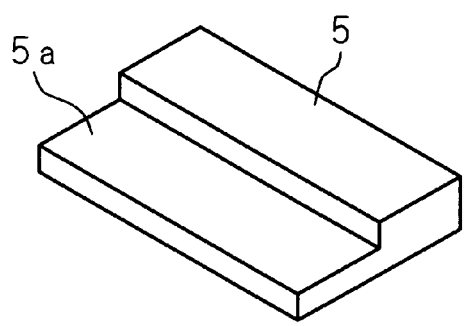
FIGS. 3A to 3D are illustrative views of the representative machining features.
Figure 3B:
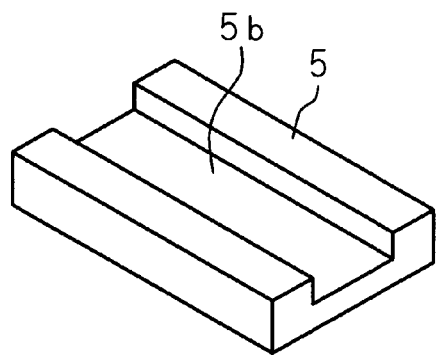
Figure 3C:
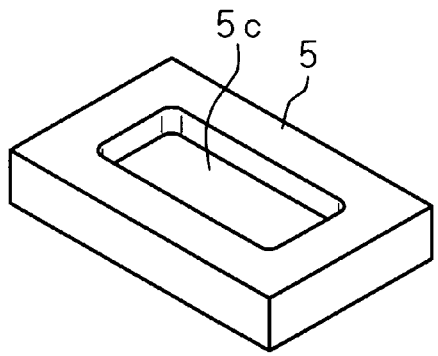
Figure 3D:
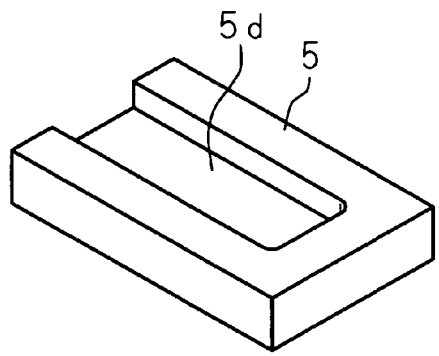

FIGS. 3A to 3D are the illustrative views of the representative machining features. FIG. 3A shows a shoulder machining feature for forming a down shoulder portion 5a on one side of the top face of the workpiece 5. FIG. 3B is a groove machining feature for forming a predetermined groove 5b on the top face of the workpiece 5. FIG. 3C is a pocket machining feature for forming a pocket portion 5c of predetermined depth on the top face of the workpiece 5. The groove machining feature also includes a machining feature for forming a groove 5d in which only one side in the longitudinal direction is open, as shown in FIG. 3.

Figure 4A:
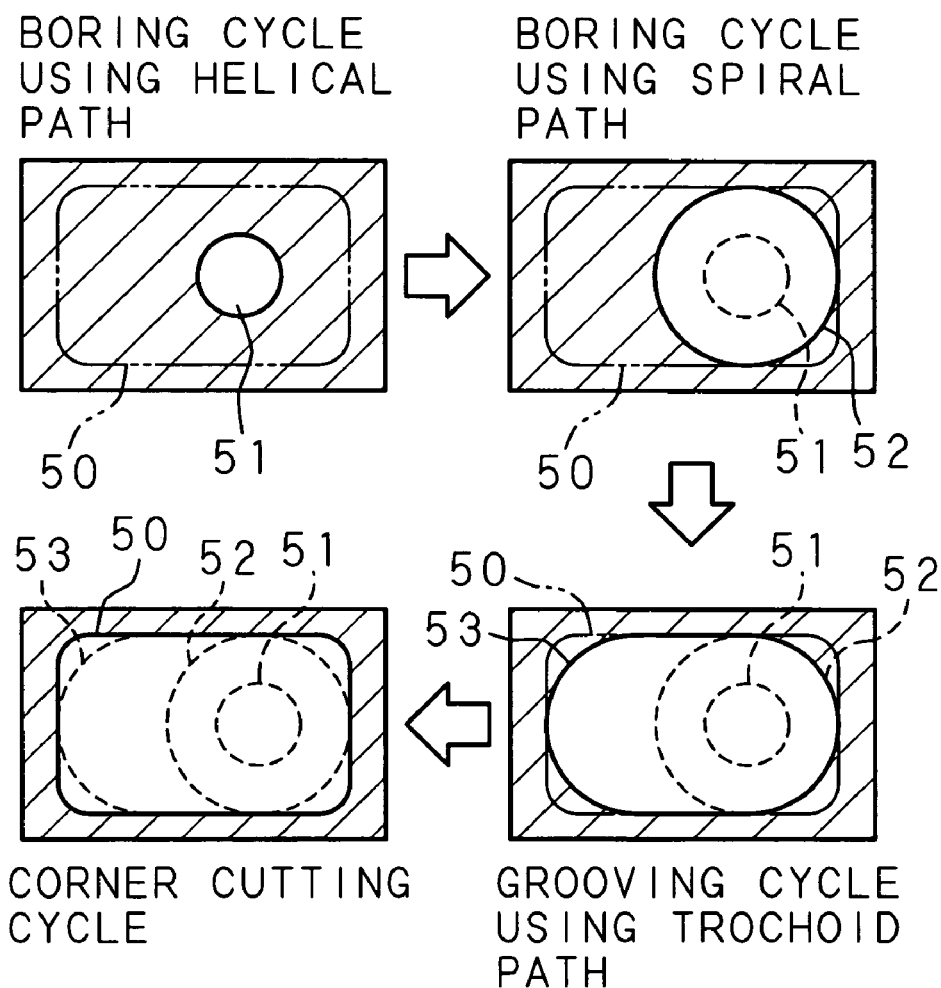
FIGS. 4A and 4B are illustrative views of the examples of combinations of the fixed cycles to the pocket machining feature.
Figure 4B:
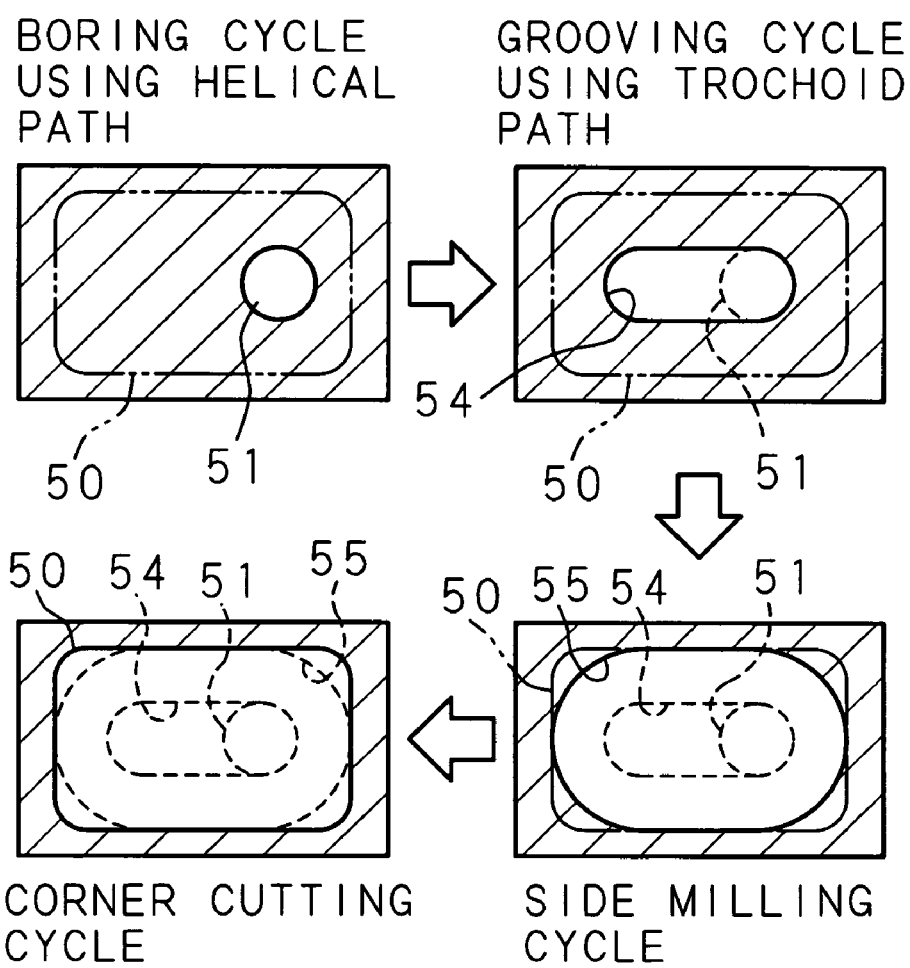

Generally, a plurality of combinations of the fixed cycles can be allotted to the machining features as shown above, and quite a large number of combinations of the fixed cycles are conceivable for machining to obtain all the machining features existing on a workpiece 5. FIGS. 4A and 4B are the illustrative views of an example of the combinations of the fixed cycles for the pocket machining feature.

In FIG. 4A, a prepared hole 51 having an optional diameter is formed on the predetermined position inside the machining region 50 shown by alternate long and two short dashes line in the drawing. The prepared hole 51 can be formed during the boring cycle using helical path, and it may be substituted by drilling when it is possible to use a drill as a tool. Next, the thus formed prepared hole 51 is expanded to a large diameter hole 51 of circular section having a diameter corresponding to the width of the machining region 50 during the boring cycle using spiral path, followed by extending this large diameter hole 51 to one side during the grooving cycle using trochoid path to form a long hole 53 having a long diameter corresponding to the length of the machining region 50. Finally, the crescent shaped portions remaining on the four corners of the long hole 53 are removed by the corner cutting cycle to complete the machining over the whole regions of the machining region 50.

In FIG. 4B, after forming the above-described prepared hole 51, the prepared hole 51 is extended on one side by a predetermined length to form a slot 54 having narrow width by the grooving cycle using trochoid path in which an end mill of small diameter is used. Next, the slot 54 is expanded by machining of the inner circumferential surface during the side milling cycle to form a long hole 55 ranging over the whole length and whole width of the machining region 50. Finally, the crescent shaped portions remaining on the four corners of the long hole 55 are removed during the corner cutting cycle to complete the cutting over the whole regions of the machining region 50.

Figure 5:
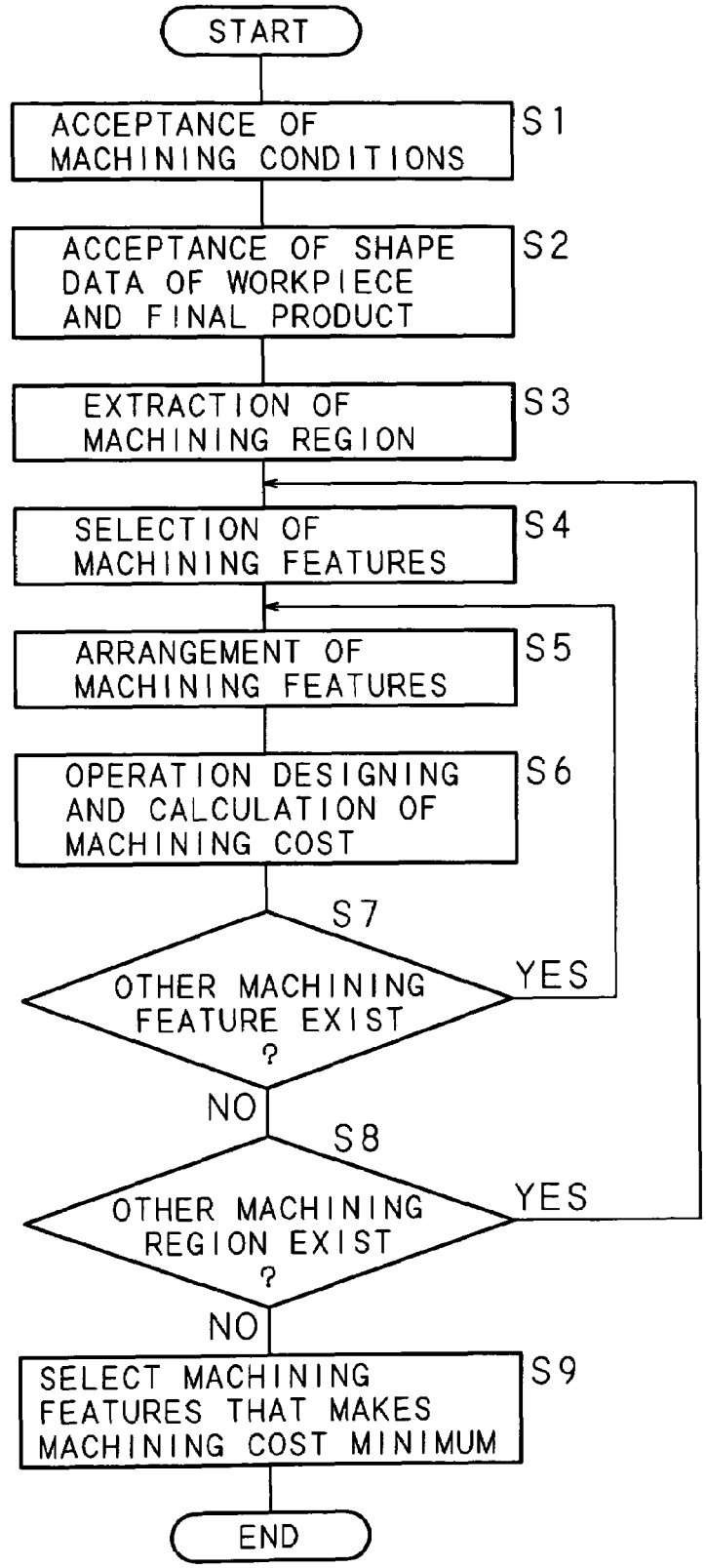
FIG. 5 is a flow chart showing the practice procedure of the process planning method according to the present invention.

FIG. 5 is a flow chart showing the implementation procedure of the process planning method according to the present invention by the process planning apparatus 1, more particularly, the implementation procedure of the process planning method according to the present invention by the CPU 10 of the process planning apparatus 1.

The process planning apparatus 1 starts its motion according to the predetermined operation of the input operation unit 15. At first, it accepts the machining conditions given by the operation of the input operation unit 15 (Step 1), and accepts the shape data of the workpiece 5 given from the CAD system 4 (Step 2).

The shape data given from the CAD system 4 are the shape data of the workpiece 5 after completion of machining designed in the CAD system 4 (hereinafter to be referred to as a final product), which may contain the shape data of the workpiece 5 before machining (hereinafter to be referred to as a raw material). The machining conditions given from the input operation unit 15 are the parameters to be necessitated for the process planning and preparation of NC program such as the material quality of the raw material, size of the selectable end mill, material, and the like. The shape data of the above-described raw material may be given by the operation of the input operation unit 15.

After completion of the accepting as described above, the process planning apparatus 1 recognizes the difference of the shapes between the raw material and the final product and extracts the machining region (Step 3), and then selects the machining features including the order of implementation (step 4). This selection is applicable to the plural kinds of machining features such as shown in FIGS. 3A to 3D. The selectable machining features are registered in advance in the above database 13. The machining regions may be extracted as plural regions, and further, several kinds of selection are conceivable for the selection of the machining features carried out in a manner as shown below. Accordingly, the following procedures are repeatedly carried out on each extracted machining region, and at each selection of the machining features.

Figure 6:
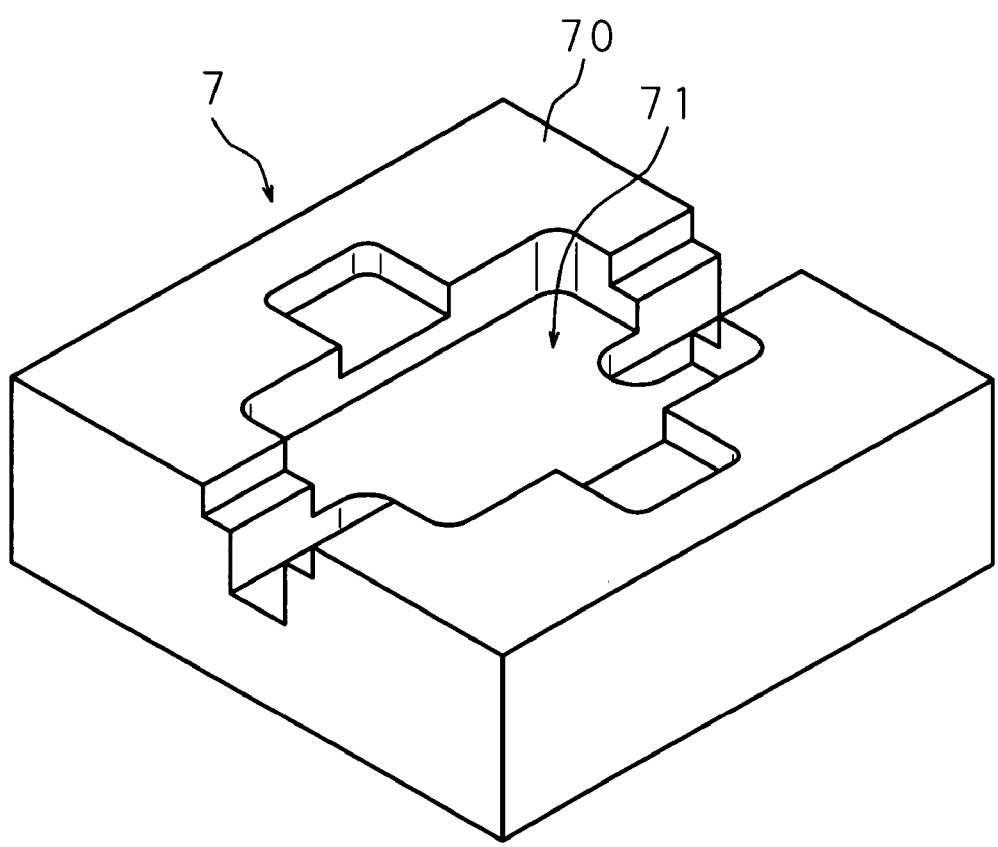
FIG. 6 is an illustrative view of the selection procedure of the machining features.

FIG. 6 to FIG. 11 are the illustrative views of the selection procedures of the machining features. FIG. 6 shows a target final product 7. When a recess having the illustrated shape is formed on the top surface of the raw material 70 of rectangular block shape, as the final product 7, the whole recess is extracted as a single machining region 71. For the illustrated machining region 71, five selection patterns of the machining features as shown below are conceivable.

In a first pattern shown in FIG. 7, at first, as shown in FIG. 7A, a groove machining feature for a groove passing across the center of the upper surface is selected. Next, as shown in FIG. 7B, a shoulder machining feature is selected to obtain the pockets of the same depth by expanding the width of the central part of this groove to both sides, and then, as shown in FIG. 7C, a shoulder machining feature for expanding the upper half part of the groove remaining on both sides of the pocket, and next, as shown in FIG. 7D, a one side opened groove machining feature is selected for increasing the depth of the afore-described groove and extending to the inside of the pocket, and finally, as shown in FIG. 7E, a one-side opened groove machining feature is selected for forming the groove of the shallower bottom than the pocket at the center of the two side surfaces of the pocket.

Figure 8C:
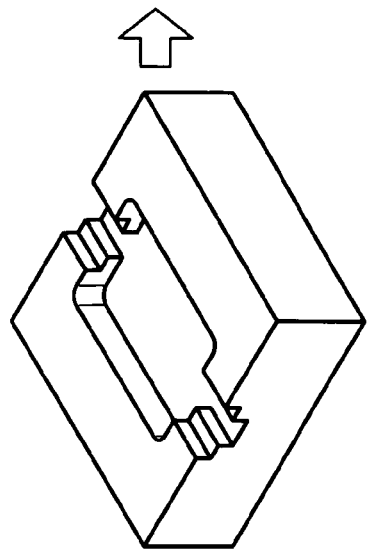
FIGS. 8A to 8E are illustrative views of the selection procedure of the machining features.
Figure 8B:
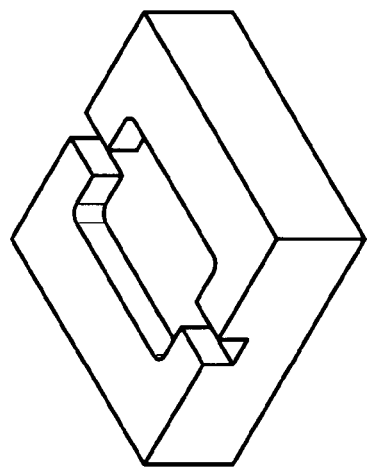
Figure 8A:
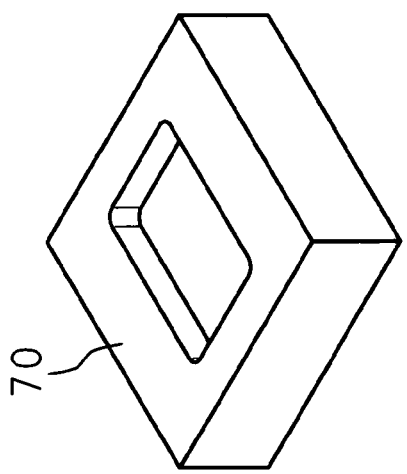
Figure 8E:
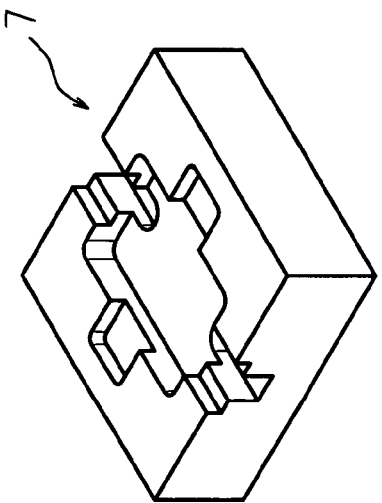
Figure 8D:
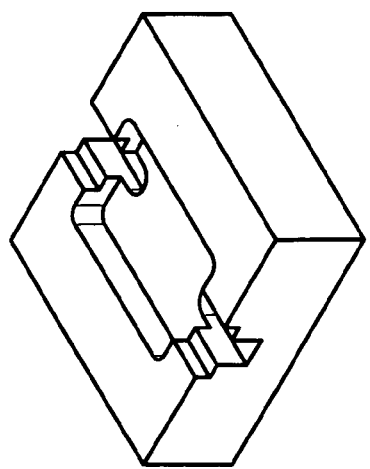

In a second pattern shown in FIG. 8, at first, as shown in FIG. 8A, a pocket machining feature is selected so as to form a pocket of large area at the center of the upper surface, and next, as shown in FIG. 8B, a groove machining feature is selected for forming the grooves of the same depth at the center of the peripheral parts remaining on both sides of the pocket, and subsequently, as shown in FIGS. 8C to 8E, a machining feature similar to that of the first pattern is selected.

Figure 9C:
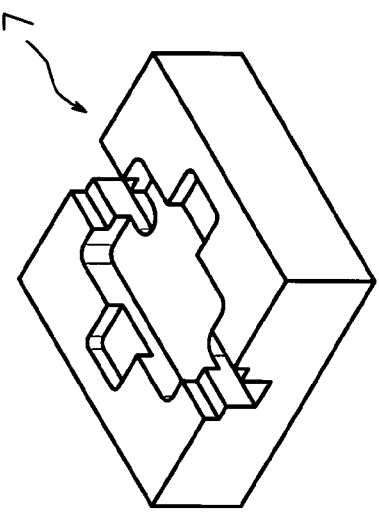
FIGS. 9A to 9F are illustrative views of the selection procedure of the machining features.
Figure 9B:
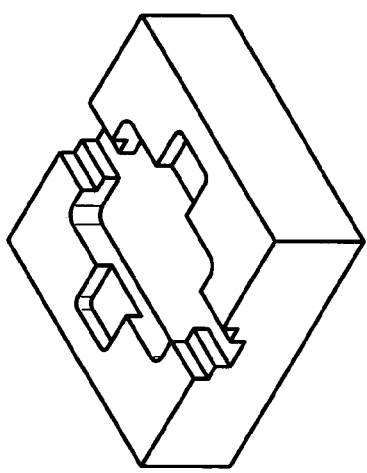
Figure 9A:
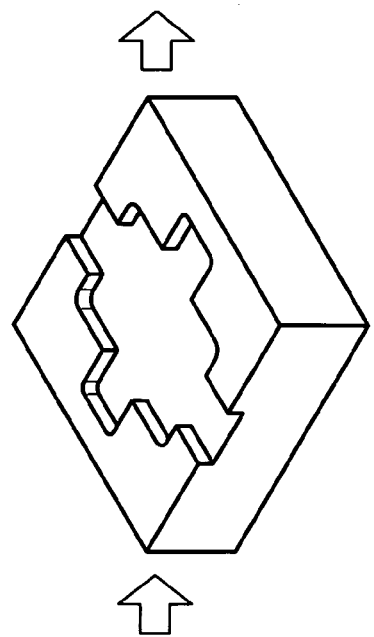
Figure 9F:
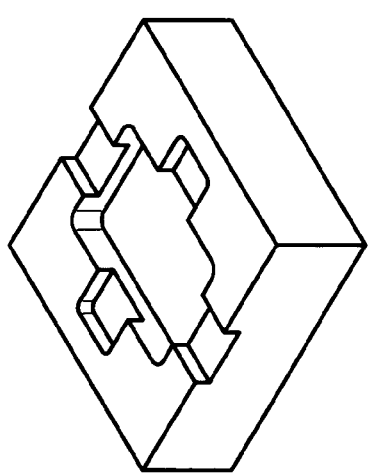
Figure 9E:
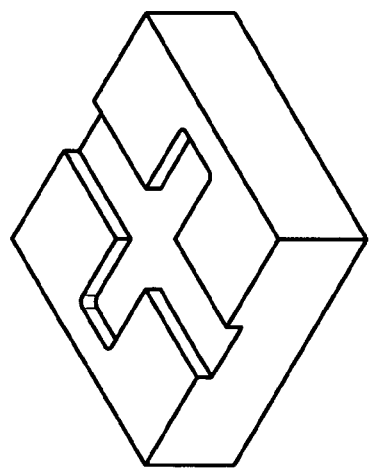
Figure 9D:
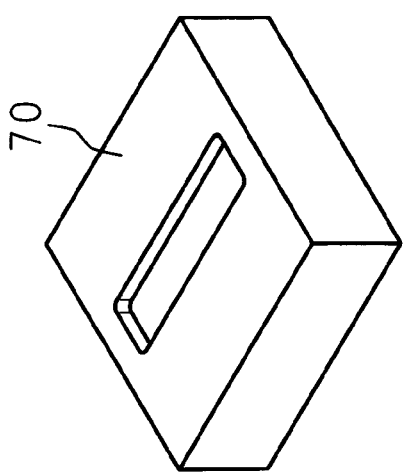

In a third pattern shown in FIG. 9, at first, as shown in FIGS. 9A and 9B, a pocket machining feature and a groove machining feature are selected in this order to form a pocket and a groove crossing at the center of the upper surface, and next, as shown in FIG. 9C, a shoulder machining feature is selected for obtaining the pockets having the same depth by enlarging the crossing part of the pocket and the groove in four directions, and next, as shown in FIG. 9D, the pocket machining feature is selected again for increasing the depth of the enlarged pockets, and finally, as shown in FIGS. 9E and 9F, a groove machining feature is selected for increasing the depth of the open grooves remaining on both sides of the pocket having the increased depth.

In a fourth pattern shown in FIG. 10, at first, as shown in FIG. 10A, a groove machining feature is selected for forming a groove of wide width and shallow bottom crossing the center of the upper surface, and next, as shown in FIG. 10B, a one-side open groove machining feature is selected for forming a groove of narrow width and deep bottom over the predetermined length on both sides of the formed groove. Next, as shown in FIG. 10C, a shoulder machining feature is selected for forming the pockets of the same depth by enlarging the central part of the groove having shallow bottom to both sides. Next, as shown in FIG. 10D, a pocket machining feature is selected for increasing the depth of the formed pocket, and finally, as shown in FIG. 10E, a one-side open groove machining feature is selected for forming a groove having the shallower bottom than the pocket at the center of both side surfaces of the pocket having the increased depth.

In a fifth pattern shown in FIG. 11, at first, as shown in FIG. 11A, a pocket machining feature is selected for forming a pocket having large area at the center of the upper surface, and next, as shown in FIG. 11B, a one-side open groove machining feature is selected for forming a groove having the shallower bottom than the formed pocket at the center of both side surfaces thereof; then, as shown in FIG. 11C, a groove machining feature is selected for forming a shallow bottomed open groove at the center of the periphery remaining on both end parts of the pocket, and next, as shown in FIG. 11D, a groove machining feature is selected for increasing the depth of the open groove, and finally, as shown in FIG. 11E, a one-side open groove machining feature is selected for further increasing the depth of the open groove so as to extend it to the inside of the pocket.

In step 3 of the flow chart shown in FIG. 5, a machining region 71 as shown in FIG. 6 is extracted. And, in step 4, selection of the machining features to the extracted machining region 71 is performed as shown in FIG. 7 to FIG. 11. Though the selection patterns of the machining features are countless, the number of the selected patterns can be decreased by setting the optional restrictive conditions such as by excluding the machining features which do not ultimately remain in the corresponding part of the final product 7.

After completing the selection of the machining features in the manner as above, the selected machining features are arranged in order (step 5). This arrangement is a processing in which, for example, when the feature factors overlap, they are unified as a single block, and those having the same configuration and size are arranged in a group in the respective block unit. For example, in the second pattern shown in FIG. 8, the groove machining features on both sides of the pocket are arranged as an identical group.

Next, the process planning apparatus 1 performs operation designing on the combination pattern of the selected machining features to calculate the machining cost required for implementing the operation designing (step 6). Here, the operation planning is a processing for segmentalization to allocate the fixed cycles shown in FIGS. 2A to 2F to the respective machining features selected, as stated above. The machining cost $C_m$ is calculated by the steps of preparing the NC programs for each one of a plurality of allocation patterns of the fixed cycles, selecting the end mill as a machine tool for each one of a plurality of the fixed cycles and obtaining the machining time and the damage level of the end mill by deciding the tool path and feed rate, by means of an assessment function shown in the following equation, using the obtained machining time and the damage level of the end mill, and the fixed costs including the machine charge, labor cost, and the tool cost, etc.

$$C_m = c_m T_m + c_L L_t / L_f \quad (1)$$

wherein,
$c_m$: Machine charge and labor cost per hour (¥/h)
$T_m$: Machining time (h)
$c_L$: Cutting tool cost (¥)
$L_t$: Life consumption rate of cutting tool
(When $\Sigma L_t / L_f = 1$, it is considered to be the extinction of the tool life)
$L_f$: Durable life of cutting tool In the case where the selling price $C_k$ of the final product is decided, in addition to the calculation of the machining cost $C_m$ by the equation (1), profit rate P may be calculated by the following equation:

$$P = (C_k - C_m) / T_m \quad (2)$$

On the other hand, in the case of the general final products whose selling prices $C_k$ fluctuate, instead of the profit rate to be calculated by the equation (2), a modified machining cost $C_s$ may be calculated by taking the estimated profit defined by the equation (3) into account. The factor $c_p$ in the equation (3) denotes a profit per hour (¥/h), which is for example obtainable in the process planning apparatus 1 as a fluctuation amount based on the selling price $C_k$ given as an input on each machining time.

$$C_s = C_m + c_p T_m = c_m T_m + c_L L_t / L_f + c_p T_m \quad (3)$$

For preparing the NC program to be used for calculation of the machining cost above, the method disclosed in the foregoing patent document (Japanese Patent Application Laid-Open No. 2003-263208 (2003)) by the applicant of the present invention may be used. According to the method, the anticipated values of the cutting force exerted to the end mill which is moved by feeding according to the respective fixed cycles is obtained, and the tool path of the end mill is determined together with the feed rate so as to maintain this anticipated value to be a proper value. In this manner, it becomes possible to prepare an NC program which can attain both high machining efficiency and high machining accuracy while reducing the damage and excessive wear of the end mill, and the durable life of the end mill and the consumption rate to be used for calculating the machining cost by each equation given above can be presumed in high accuracy.

After completion of calculation of the machining cost, the process planning apparatus 1 examines whether or not other selection patterns of machining features are conceivable (step 7), and when another selection pattern of other machining features is conceivable, the operation returns to the step 5 to repeat the similar processing to the new selection pattern. On the other hand, when another selection pattern of machining features is not conceivable, examination is made as to whether or not any other machining region exists or not (step 8), and when another machining region exists, the operation returns to the step 4 to repeat the similar processing to a new machining region.

When it is determined in step 8 that there does not exist any new machining region, the operation advances to the step 9. In the step 9, for example, the selection pattern of the machining features in which the sum total of the machining cost $C_m$ calculated by the above equation (1) as an assessment function becomes the minimum is adopted as the result of the optimum process plan, and the NC program based on this selection pattern is outputted to complete a series of process planning operations.

In step 9, an optimization may be achieved by using the equation (2) for calculating the profit rate P or the equation (3) for calculating the modified machining cost C3 as an assessment function. Here, in the case where the profit rate P is used, the selection pattern of the machining feature in which the profit rate P becomes the largest is adopted as a result of the optimal process planning, and in the case where the modified machining cost C3 is used, the selection pattern of the machining feature in which the modified machining cost becomes the smallest is adopted as a result of the optimal process plan. In the step 9, calculation is performed for the assessment value (machining cost $C_m$, profit rate P or modified machining cost C3) using the assessment function may be carried out to display the results in a lump in the display unit 16, so that the selection of the ultimate machining features is made by the operator.

Figure 12:
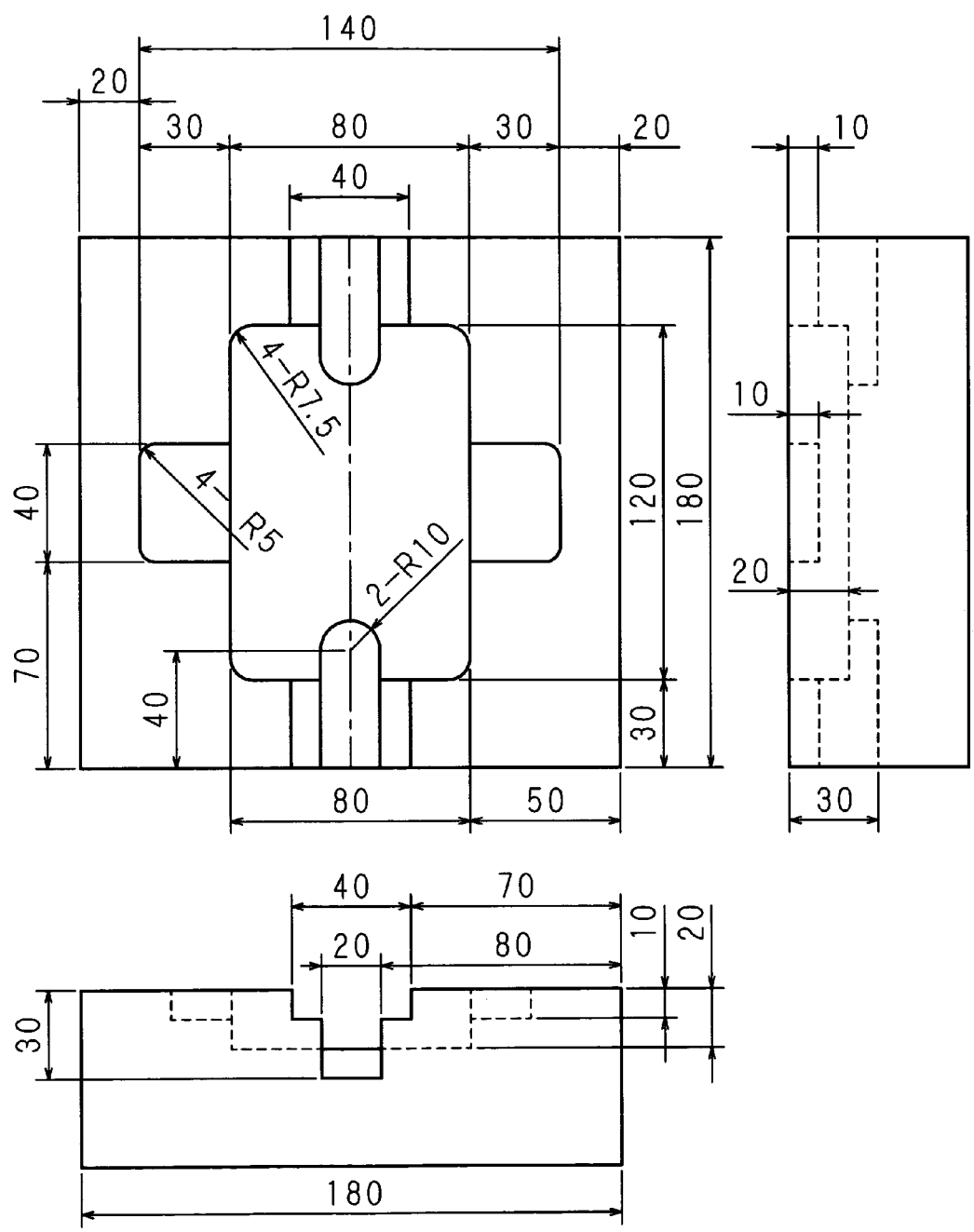
FIG. 12 is a view to show the actual size of the final product used for the evidencing experiment of the process planning method according to the present invention.

Next, explanation is given on the results of the process plan obtained by implementing the process planning method according to the present invention, with the final product 7 shown in FIG. 6 taken as a subject. In FIG. 12 the actual dimensions of the final product 7 is shown. The raw material 70 is a rectangular block made of the carbon steel S50C (J.I.S.) for structural use.

The machining conditions are as shown below.
Machine tool: Vertical machining center
Cutting tool: (Al, Ti) N coated carbide solid end mill, φ10 to 20 (4 blades)
Cutting Condition: Cutting speed of 175 m/min to 230 m/min (Cut-in amount in the axial direction is no more than the diameter of the end mill)

FIGS. 13A to 13E are the diagrams to show the results of obtaining the machining cost $C_m$ by the equation (1) by executing the operation planning to the respective patterns 1 to 5 shown in FIG. 7 to FIG. 11. In these diagrams the machining time and the cutting length are also shown. By comparison of these diagrams it can be seen that the machining cost $C_m$ becomes the minimum when the pattern 1 shown in FIG. 7 is selected. In this case, in the step 9 the pattern 1 is adopted as a result of the optimal process plan.

FIG. 14 is a diagram showing the result of the process plan based on the optimal pattern. Shown in this diagram is the results of the process plan which makes the modified machining cost $C_s$ set by the above-mentioned equation (3) minimum, along with the results of the process planning which makes the machining cost $C_m$ set by the above-mentioned equation (1) minimum. The modified machining cost $C_s$ has been calculated on assumption of the profit $c_p$ per hour to be 0.3.

FIG. 15 is a graphic chart showing the result of the process plan by a production engineer. The results of the process planning shown in this diagram are those determined by the skilled engineer based on his experience in the past, on assumption that the final product 7 shown in FIG. 12 is processed under the entirely same machining conditions. The results of this process plan is utterly different from the results of the process plan shown in FIG. 14.

Table 1 shows the results of comparison of machining time and machining cost in the case where the results of the process plans shown in FIGS. 14 and 15 are adopted.

TABLE 1

|  | Machining time (min) | Machining cost $C_m$ (¥) | Machine Charge (¥) | Tool Cost (¥) | Profit (¥) |
|---|---|---|---|---|---|
| Process Plan by Engineer | 21 | 39,273 | 3,498 | 35,775 | 0 |
| Process Plan without Estimation of Profit | 60.5 | 22,000 | 10,075 | 11,925 | 0 |
| Process Plan with Estimation of Profit | 53.0 | ($C_s$) 26,227 | 8,833 | 14,744 | 2,650 |

As shown in this Table 1, in the results of the process plan according to the present invention using the equation (1) as an assessment function (process plan without profit), the machining cost becomes minimum (¥22,000). This machining cost is close to ½ of the machining cost obtained as a result of the process plan by the engineer (¥39,273). On the other hand, according to the machining time comparison, the machining time in the case of the process plan without estimation of the profit is nearly three times of the machining time in the case of the process plan by the engineer. Comparison between FIG. 14 and FIG. 15 shows that, in the process plan by the engineer, priority is given to reduction of the machining time, and rigorous feed rate and cut-in amount settings are applied to the end mill used as a cutting tool, so that the increased cutting tool cost by these settings has induced an increase in the machining cost $C_m$.

Besides, as shown in Table 1, in the process plan using the equation (3) as an assessment function (process plan with estimation of profit), the machining cost and the machining time are respectively the intermediate values of other two results. These results are because of the fact that, under the environment in which an optional profit margin can be estimated per unit time, shortening of the machining time acts advantageously.

In the above-mentioned embodiment, an apparatus (process planning apparatus 1) equipped with a hardware of exclusive use for the implementation of the process planning method according to the present invention. However, the aforementioned procedures in the process planning method according to the present invention may be recorded as a computer program into a computer-readable recording medium. This recording medium may be mounted on a general-purpose computer, whereby the program may be loaded up. Then, the method according to the invention may be implemented using the CPU and the RAM of the computer as the processing unit and the storage unit of the invention.

Figure 16:
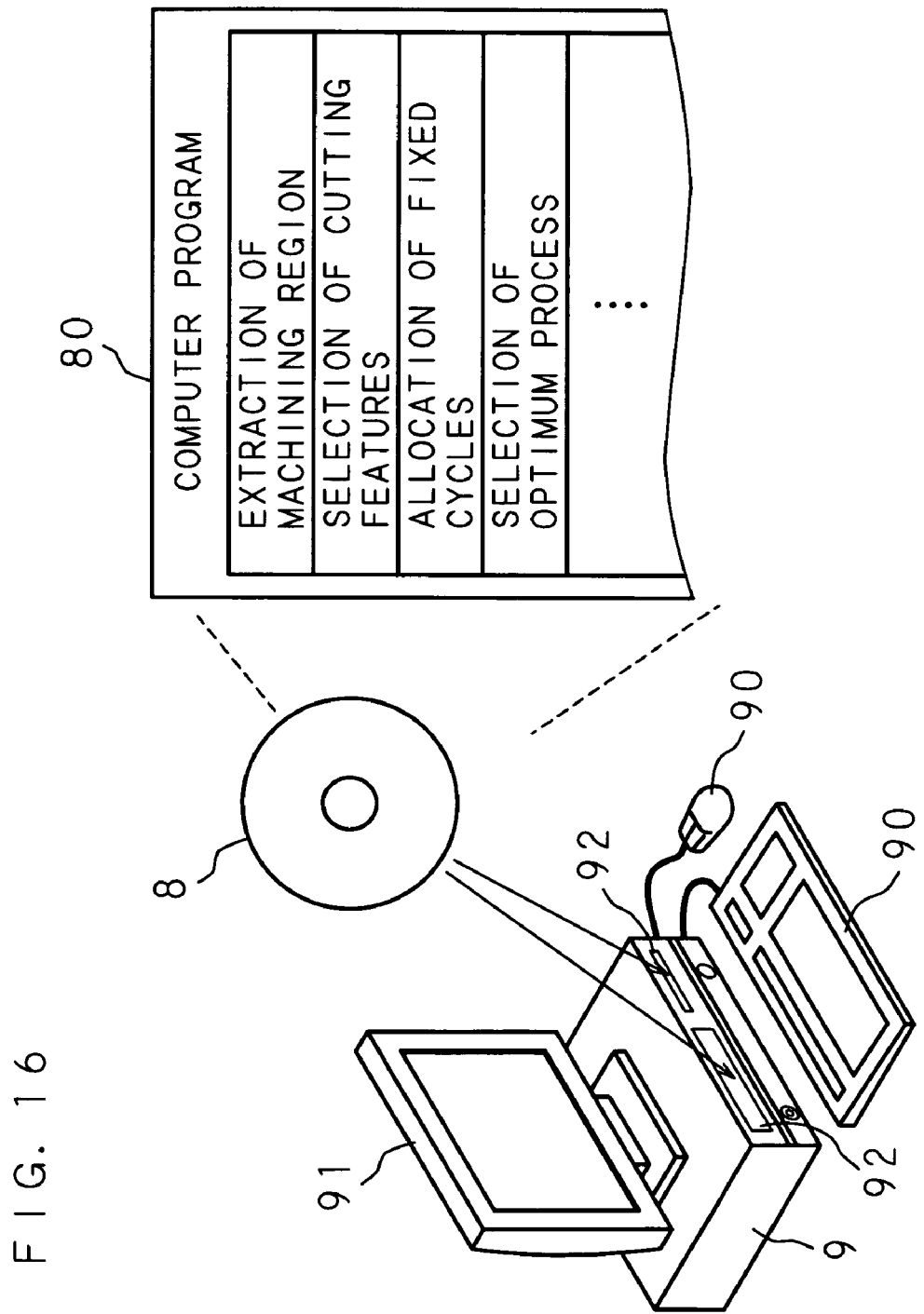
FIG. 16 is a schematic view showing another embodiment of the present invention.

FIG. 16 is a schematic diagram illustrating such an embodiment. In the figure, the numeral 8 denotes a recording medium such as an optical disk or a magnetic disk. In the recording medium 8, a computer program 80 containing program codes for causing a computer to execute the procedures corresponding to the respective steps shown in the flow chart of FIG. 5 is recorded.

The recording medium 8 is mounted on a disk 92 of a general purpose computer 9 comprising inputting means 90 such as a keyboard and a mouse; and a displaying means 91 such as CRT display or a liquid crystal display; whereby the program is read out by the computer. Accordingly, the computer program 80 stored in the recording medium 8 is loaded up to the computer 9, whereby the computer 9 implements the process planning method according to the present invention.

In addition to the use of the recording medium 8, the loading-up of the computer program 80 to the computer 9 may be carried out in another appropriate method such as the use of another computer connected on line through a network such as the Internet.

As will be apparent from the detailed description given above, in the process planning method and process planning apparatus according to the present invention, the machining region extracted from the difference of shapes before and after the machining of the workpiece is replaced with the predetermined machining features; the fixed cycles are allocated to the respective machining features so as to be recognized as an assembly of the fixed cycles, whereby an assembly for making an assessment function relating to the machining cost optimum is selected. Accordingly, an optimal process design for carrying out a predetermined machining on a workpiece can be obtained, which satisfies conditions of minimizing the overall machining cost that takes into account the machine charge, tool cost, selling price of the final product, etc. without necessitating the designer's experience and complicated work.

Further, when the computer program stored in the recording medium of the present invention is loaded up to a general-purpose computer, the process planning method of the present invention is implemented. This permits the process plan satisfying conditions of minimizing the overall machining cost to be implemented easily. These are the advantages of the invention.

As this invention may be embodied in several forms without departing from the spirit of essential characteristics thereof, the present invention is illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A process planning method for determining a process for performing predetermined machining of a workpiece using a plurality of types of end mills, the method comprising the steps of:

using a computing device to provide plural kinds of fixed cycles, defined as machining cycles, in which a tool path pattern can be fully determined by the computing device in an automated fashion according to shapes before and after the machining, and also to provide and fully determine plural kinds of machining features, defined as shapes, that can be obtained by one of, or plural combinations of the fixed cycles;

extracting a region to be machined based on a difference calculated by the computing device between shapes of externally provided shape data of the workpiece before and after the machining;

replacing, in an automated fashion, the extracted region with a plurality of combinations of the provided and fully determined plural kinds of machining features;

selecting a combination of machining features from among the plurality of combinations of machining features from said replacing;

arranging the selected machining features in order;

allocating at least one fixed cycle to each of the selected machining features; and employing a computing device to apply an assessment function relating to a machining time and a life of the end mills to each combination of the machining features to which a fixed cycle is allocated in order to generate an assessment value; and selecting, in an automated fashion, a group of fixed cycles which improves efficiency of the machining process with respect to at least one machining parameter, based on said assessment value.

2. The method of claim 1, wherein a group of fixed cycles is further selected in order to minimize a number of tools used.

3. The method of claim 1, wherein a group of fixed cycles is further selected in order to minimize machining time.

4. The method of claim 1, wherein a group of fixed cycles is further selected in order to minimize a time any one tool is used.

5. The method of claim 1, wherein said computing device is a digital computer equipped with CAD/CAM software.

6. The method of claim 1, wherein the at least one machining parameter is an anticipated completion time of the workpiece.

7. The method of claim 1, wherein said assessment value comprises a machine cost and a machine time for at least one of said plurality of types of end mills.

8. A process planning apparatus for determining a process for performing predetermined machining of a workpiece using a plurality of types of end mills, said apparatus comprising:

a database in which a plurality of predetermined machining features and fixed cycles are stored;

a determination unit that provides, from said database, plural kinds of fixed cycles, defined as machining cycles, in which a tool path pattern can be fully determined by a computing device in an automated fashion according to shapes before and after the machining, and that also provides and fully determines, from said database, plural kinds of machining features, defined as shapes, that can be obtained by one of, or plural combinations of the fixed cycles;

an extraction unit that extracts a region to be machined based on a difference of externally provided shape data of the workpiece before and after the machining;

a region replacement device that replaces, in an automated fashion, the extracted region with a plurality of combinations of the provided and fully determined plural kinds of machining features stored in the database;

a feature selector that selects a combination of the machining features from among the combinations of features that the replacement device replaced said region with;

a feature arranger that arranges the selected machining features in order;

a cycle allocator that allocates at least one of the fixed cycles stored in the database, respectively, to each of the selected machining features; and an automated assessment unit that applies an assessment function relating to a machining time and a life of the end mills to each combination of the machining features to which a fixed cycle is allocated, thereby obtaining an assessment value related to improving at least one machining parameter.

9. The apparatus of claim 8, wherein said cycle allocator allocates fixed cycles in order to minimize a number of tools used.

10. The apparatus of claim 8, wherein said cycle allocator allocates fixed cycles in order to minimize machining time.

11. The apparatus of claim 8, wherein said cycle allocator allocates fixed cycles in order to minimize a time any one tool is used.

12. The apparatus of claim 8, wherein said computing device is a digital computer equipped with CAD/CAM software.

13. The apparatus of claim 8, wherein the at least one machining parameter is an anticipated completion time of the workpiece.

14. The apparatus of claim 8, wherein said assessment value comprises a machine cost and machine time for at least one of said plurality of types of end mills.

15. A computer memory product readable by a computer, having a program of instructions executable by the computer to determine a process for performing predetermined machining of a workpiece using a plurality of types of end mills comprising:

providing plural kinds of fixed cycles, defined as machining cycles, in which a tool path pattern can be fully determined by the computer in an automated fashion according to shapes before and after the machining, and also providing and fully determining plural kinds of machining features, defined as shapes, that can be obtained by one of, or plural combinations of the fixed cycles;

extracting a region to be machined based on a difference in shapes of externally provided shape data of the workpiece before and after the machining;

replacing, in an automated fashion, the extracted region with a plurality of combinations of the provided and fully determined plural kinds of machining features;

selecting a combination of machining features from among the plurality of combinations of machining features from said replacing step;

arranging the selected machining features in order;

allocating at least one fixed cycle to each of the selected machining features; and applying an assessment function relating to a machining time and a life of the end mills to each combination of the machining features to which a fixed cycle is allocated, thereby selecting a group of fixed cycles which results in an assessment value related to improving at least one machining parameter.

16. The program of claim 15, wherein the at least one machining parameter is an anticipated completion time of the workpiece.

17. The program of claim 15, wherein said assessment value comprises a machine cost and machine time for at least one of said plurality of types of end mills.

18. The program of claim 15, wherein said program is designed to work with a CAD or CAM program.

* * * * *